United States Patent [19]
Froment

[11] Patent Number: 4,837,468
[45] Date of Patent: Jun. 6, 1989

[54] DOUBLE CASING FOR ELECTRIC ROTATING MACHINE STATOR

[75] Inventor: Francis Froment, Lyons, France

[73] Assignee: Equipements Electriques Moteur, Creteil Cedex, France

[21] Appl. No.: 156,662

[22] Filed: Feb. 17, 1988

[30] Foreign Application Priority Data

Feb. 17, 1987 [FR] France ............................... 87 02520

[51] Int. Cl.$^4$ .......................... H02K 5/26; F16L 55/12
[52] U.S. Cl. ....................................... 310/42; 29/596; 310/89; 310/254
[58] Field of Search ...................... 29/596; 310/42, 89, 310/154, 254, 259

[56] References Cited

U.S. PATENT DOCUMENTS

| | | | |
|---|---|---|---|
| 2,903,610 | 9/1959 | Bessiere ................................. | 310/220 |
| 3,200,275 | 8/1965 | Lindgren ............................... | 310/254 |
| 3,200,475 | 8/1965 | Weber et al. ....................... | 29/155.53 |
| 4,464,595 | 8/1984 | Hamano et al. ...................... | 310/154 |
| 4,760,634 | 8/1988 | Rapp ..................................... | 29/509 |

FOREIGN PATENT DOCUMENTS

| | | |
|---|---|---|
| 0015165 | 9/1950 | European Pat. Off. . |
| 1194287 | 11/1959 | France . |
| 2426506 | 12/1979 | France . |
| 432786 | 8/1935 | United Kingdom . |

*Primary Examiner*—Patrick R. Salce
*Assistant Examiner*—D. L. Rebsch
*Attorney, Agent, or Firm*—Wenderoth, Lind & Ponack

[57] ABSTRACT

A double casing for an electric rotating machine stator includes two pipes placed coaxially one inside the other. The pipes have therethrough aligned openings for receiving screws for mounting polar supports to the inside of the casing. Each hole in the outer pipe is formed by performing a punching deformation operation of an initially cylindrical hole in the outer pipe. This forms a countersink dimensioned to accommodate the head of a respective screw. Such operation also forms a boss of the material of the outer pipe and causes such boss to extend inwardly from the countersink into the corresponding hole in the inner pipe.

8 Claims, 2 Drawing Sheets

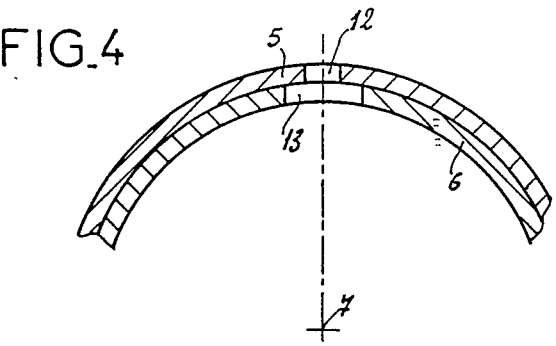
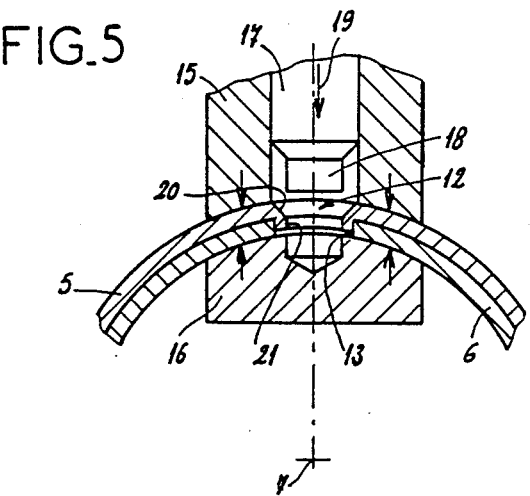

DOUBLE CASING FOR ELECTRIC ROTATING MACHINE STATOR

BACKGROUND OF THE INVENTION

This invention relates to an electric rotating machine stator comprising a double casing designed to contain polar grounds fastened to the casing by screws. The invention relates especially to electric rotating machines employed in automobile equipment, particularly electric starter motors. The invention further relates to a method of formation of such double casing.

In starter motors, the polar grounds of the stator, which are used to support induction windings, are generally attached to the inside of the casing by screws. For this purpose, the casing has equidistantly spaced holes around its periphery, and such holes are traversed by the screws that attach the polar grounds. Each hole in the casing has milled in its outer opening a countersink into which fits a countersunk head of the attachment screw.

Boring the holes in the casing and milling chamfered countersinks do not involve particular difficulties when the casing is composed of a single, relatively thick, pipe. It is a different case when, in a manner known in and of itself as described for example, in U.S. Pat. No. 3,200,475, the casing is composed of two thinner pipes positioned and fastened one over the other coaxially. Such arrangement makes the casing easier to handle and produces a considerable savings of materials while maintaining the same magnetic performance. At the positions provided for the screws for connecting the polar grounds, holes are bored in the inner pipe to correspond with other holes bored in the outer pipe. Because of the thinness of the outer pipe of the two-part casing, it is impossible to mill the countersinks for the heads of the polar ground attachment screws in the appropriate manner.

SUMMARY OF THE INVENTION

With the above discussion in mind, it is an object of the present invention to provide a double casing in a stator whereby it is possible to overcome the above and other prior art disadvantages. It furthermore is an object of the present invention to provide a novel method for the formation of such a double casing.

These objects are achieved according to the present invention by the provision of an electric rotating machine stator comprising a double casing, of the type including two tubes or pipes arranged coaxially, one inside the other. The inner pipe has, at locations provided for screws used to attach polar grounds, holes that correspond to other holes located in the outer pipe. Each hole in the outer pipe, initially cylindrical, is punched to form a countersink that accommodates the head of the screw attaching the respective polar ground. Bosses formed from the material of the outer pipe by the punching operation extend inwardly from each of the holes in the outer pipe into corresponding of the holes in the inner pipe.

Thus, the milling of countersinks is eliminated and is replaced by a simple embossing operation that forms a tapered flange around each of the pre-existing holes in the outer pipe and pushes part of the material of the outer pipe into the corresponding hole in the inner pipe. This arrangement provides a simple, reliable and economical method for forming countersinks, regardless of the thickness of the outer pipe.

BRIEF DESCRIPTION OF THE DRAWINGS

Other objects, features and advantages of the present invention will be more clearly understood from the description that follows of a nonrestrictive example of an embodiment of an electric rotating machine stator, and with reference to the accompanying drawings, wherein:

FIG. 4 is a partial cross sectional view on a larger scale showing both pipes of the casing before a distortion by punching is performed thereon; and FIG. 5 is a partial cross sectional view similar to FIG. 4, but illustrating the punching operation and the result thereof.

DETAILED DESCRIPTION OF THE INVENTION

Figure 1:
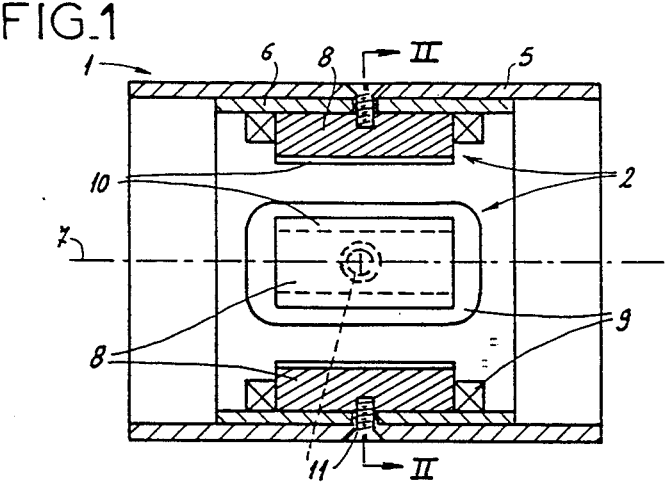
FIG. 1 is a longitudinal sectional view of an electric rotating machine stator according to the invention, taken along line I—I of FIG. 2.
Figure 2:
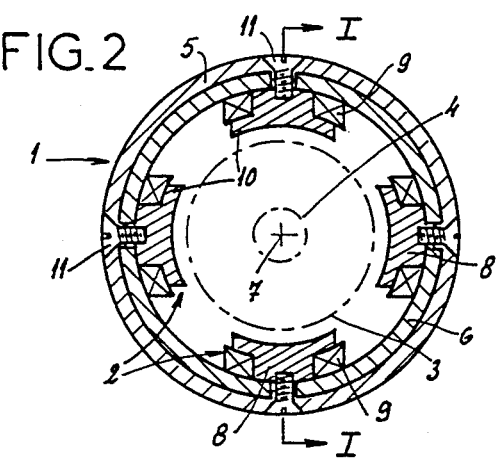
FIG. 2 is a transverse cross sectional view thereof, taken along line II—II in FIG. 1.

FIGS. 1 and 2 show an example of a stator 1 with four poles 2 of an electric rotating machine using direct current, such as the motor of an electric starter of an automobile. Inside stator 1 rotates a rotor 3 of the rotating machine, mounted on a shaft 4 thereof.

The stator 1 includes a double casing comprising, in a manner known in and of itself, an outer tube or pipe 5 and an inner tube or pipe 6, arranged coaxially of axis 7 and fitted one inside the other. Outer pipe 5 is longer than inner pipe 6, and is fitted at its ends with end plates (not shown) mounting bearings (not shown) supporting shaft 4 for rotation.

Each pole 2 of stator 1 comprises a polar mass or ground 8 attached to the inside of the casing. Around each polar ground 8 (pole support) is a winding 9 extending around a polar extension 10 of the corresponding polar ground 8. Each polar ground 8 is applied and fastened to inner pipe 6 of the casing by a fastening screw 11 passing through pipes 5 and 6.

In a manner also known in and of itself, outer pipe 5 of the casing can be made either directly from a rigid tube having a circular section or from an initially flat member that is rolled and joined at abutting ends. Outer pipe 5 has therethrough a number, corresponding to the number and at locations where the polar grounds 8 are to be attached, of holes 12, initially cylindrical in shape, as shown in FIG. 4.

Figure 3:
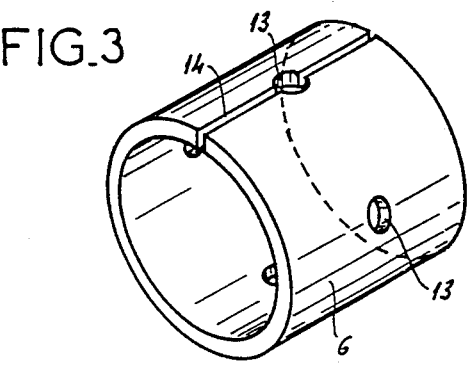
FIG. 3 is a perspective view of an inside pipe of a casing of the stator.

Inner pipe 6 of the casing can also be made from a rolled member, the ends of which are brought together as shown in FIG. 3. Inner pipe 6 also has therethrough holes 13, initially cylindrical in shape, at locations where the polar grounds 8 are to be attached. A longitudinal slot 14, which results from the method used to make inside pipe 6, bisects one of holes 13.

Inner pipe 6 is fitted into outer pipe 5, such that holes 13 in inner pipe 6 correspond and align with the initially cylindrical holes 12 in outer pipe 5. This arrangement is clearly shown for one of the pair of holes 12, 13 in FIG. 4. It is noted that the diameter of each hole 12 in outer pipe 5 is initially smaller than the diameter of corresponding hole 13 in the inner pipe 6.

As shown in FIG. 5, an operation of deformation by punching is performed at the location of each pair of superimposed holes 12, 13. For this purpose, the appropriate section of the casing being made is enclosed between two grips 15 and 16, one located outside and the other inside the casing. Outside grip 15 serves as a guide for a punch 17, which is moved in the radial direction of the casing by a device (not shown), and which has a head 18, shaped so as to produce conical deformation of the material of pipe 5 around opening 12.

Thus, when punch 17 is moved in the direction of arrow 19 towards the common axis 7 of the two pipes 5 and 6, head 18 of punch 17 penetrates the two holes 12 and 13, enlarging and altering the shape of hole 12 in outer pipe 5. Such deformation creates a truncated edge 20 around hole 12 and constituting a countersink. Such deformation also produces a plunged boss 21 extending inwardly from hole 12. Such boss consists of material from the outer pipe 5 and extends into hole 13 of inner pipe 6.

The same punching operation is performed at the location of each pair of holes 12, 13. It is to be noted that, in the case of an inner pipe 6 slit longitudinally as shown in FIG. 3, the first punching operation is done at the location of hole 13 traversed by slot 14, thereby simultaneously causing inner pipe 6 to expand and to press tightly against the inner surface of outer pipe 5.

When the punching operations have been completed, polar grounds 8 can be mounted inside the casing. The attachment screw 11 for each polar ground 8 traverses the two corresponding holes 12 and 13, and the head of screw 11 is lodged in the countersink 20.

The above operations can easily be automated.

Although the present invention has been described and illustrated with respect to preferred features thereof, it is to be understood that various changes and modifications may be made to the specifically described and illustrated features of the present invention without departing from the scope of the present invention.

I claim:

1. An electric rotating machine stator comprising a double casing, and polar grounds attached to the inside of said casing by screws, said casing including two pipes placed coaxially one inside the other, said pipes having therethrough, at locations provided for said screws used to attach said polar grounds, aligned holes, the improvement wherein each said hole in the outer pipe comprises:
   a countersink resulting from the punching deformation of an initially cylindrical hole and dimensioned to accommodate the head of a respective said screw; and
   a boss formed of the material from said outer pipe during the punching deformation operation and extending inwardly from said countersink into the corresponding said hole in the inner pipe.

2. The improvement claimed in claim 1, wherein the diameter of each said hole in said outer pipe is smaller than the diameter of said corresponding hole in said inner pipe.

3. The improvement claimed in claim 1, wherein said inner pipe is immobilized with relation to said outer pipe due to said bosses of said outer outside pipe being pushed into said holes in said inner pipe.

4. The improvement claimed in claim 3, wherein said inner pipe has therein a longitudinal slit passing through one of said holes in said inner pipe, such that the punching deformation operation in the corresponding said hole in said outer pipe causes said inner pipe to expand outwardly.

5. In a casing for an electric rotating machine stator, said casing including two pipes placed coaxially one inside the other and having at selected locations aligned holes for screws used to attach polar grounds to the inside of said casing, the improvement wherein each said hole in the outer pipe comprises:
   a countersink resulting from the punching deformation of an initially cylindrical hole and dimensioned to accommodate the head of a respective screw; and
   a boss formed of the material from said outer pipe during the punching deformation operation and extending inwardly from said countersink into the corresponding said hole in the inner pipe.

6. The improvement claimed in claim 5, wherein the diameter of each said hole in said outer pipe is smaller than the diameter of said corresponding hole in said inner pipe.

7. The improvement claimed in claim 5, wherein said inner pipe is immobilized with relation to said outer pipe due to said bosses of said outer pipe being pushed into said holes in said inner pipe.

8. The improvement claimed in claim 7, wherein said inner pipe has therein a longitudinal slit passing through one of said holes in said inner pipe, such that the punching deformation operation in the corresponding said hole in said outer pipe causes said inner pipe to expand outwardly.

* * * * *